Figure 1:
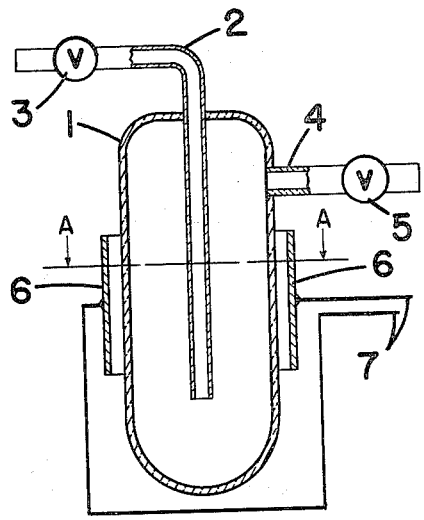

Dec. 12, 1944. C. C. BIES 2,364,940
GAS ANALYSIS AND COMBUSTION CHAMBER THEREFOR
Filed June 10, 1941

Clarence C. Bies INVENTOR.
BY P. J. Whelan
ATTORNEY.

Patented Dec. 12, 1944

2,364,940

UNITED STATES PATENT OFFICE 2,364,940

GAS ANALYSIS AND COMBUSTION CHAMBER THEREFOR

Clarence C. Bies, Houston, Tex., assignor to Standard Oil Development Company, a corporation of Delaware Application June 10, 1941, Serial No. 397,359½

4 Claims. (Cl. 23—232)

The present invention is directed to a method and apparatus for the analysis of gases containing small quantities of combustible constituents.

In the soil gas method of prospecting for oil, soil gases are analyzed for hydrocarbons higher than methane. These hydrocarbons, such as ethane, propane, etc., are found in minute quantities in soil gas collected over subterranean petroliferous deposits. The concentrations with which the prospector deals are so small, ranging from a few parts to perhaps 20 parts per million, that a quantitative analysis of them is extremely difficult. This analysis is customarily carried out by subjecting the gas to combustion and measuring the combustion products. When the combustion products measured are carbon dioxide and water, the measurement of these two constituents will yield information from which the concentration of hydrogen and hydrocarbons in the gas sample can be calculated. It will be apparent that it is important that the combustion be complete and that this step in the operation is an all-important one.

According to the present invention, small concentrations of combustible gases in soil gas samples are completely burned to carbon dioxide and water by subjecting the gas sample, at a pressure below atmospheric and preferably below about fifty mm. of mercury, to the action of high frequency currents such as those of short wave radio frequencies in a range from 7,000 to 30,000 kilocycles per second. Of course, the gas sample is first mixed with an excess of oxygen to support the combustion, but with insufficient oxygen to increase the pressure above that at which the mixture will glow, which pressure should not be in excess of 100 mm. of mercury and should preferably be below 50 mm. of mercury. The mixture of gas and oxygen is fed into a closed chamber which is surrounded by a coil or provided with external condenser plates, to which is applied a current of suitable frequency of the range hereinbefore specified. The electrical apparatus can be set up as a framework, into which the combustion chamber can be inserted for use.

The present invention is based on the discovery that combustion of combustible gases can be effected when they are subjected to high frequency currents of the order of frequencies mentioned above in a closed space maintained at a reduced pressure. If the closed space is at atmospheric pressure, or only slightly reduced pressure, combustion will not occur because the gas mixture will not glow under the influence of the high frequency current. It is not believed that the ability of gases to glow under the influence of high frequency currents at greatly reduced pressure has heretofore been utilized for the analysis of gases for small contents of combustible constituents.

It has been found that this method of burning gas is much quicker and much less subject to error than the method according to which a hot wire is employed. This method has resulted, therefore, in increased accuracy and shorter time of operation in gas analysis.

Figure 2:
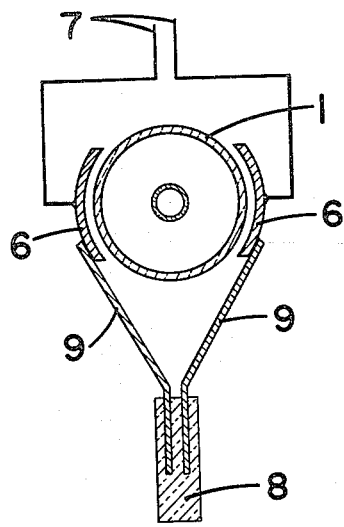
Figure 3:
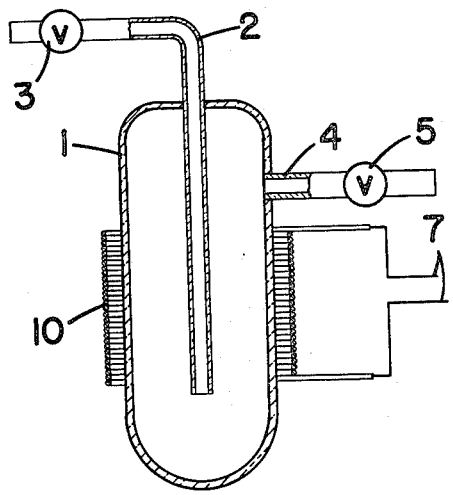
Figure 4:
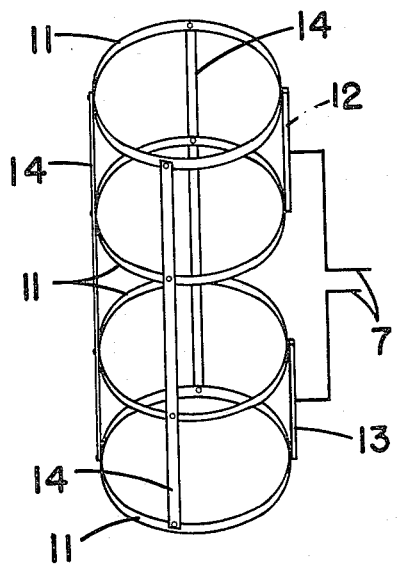

The nature of the present invention may be better understood from the following detailed description of the accompanying drawing, in which Fig. 1 is a vertical section through one type of apparatus according to the present invention; Fig. 2 is a cross section along the line A—A of Fig. 1; Fig. 3 is a vertical section of another modification of the present invention; and Fig. 4 is a perspective view of still another, and the preferred modification of the present invention.

Referring to Fig. 1 in detail, numeral 1 designates a glass bulb in which is fused an inlet tube 2, provided with a valve 3, and which has an outlet tube 4, provided with a valve 5. This outlet tube 4 is ordinarily connected to a vacuum pump. It has been found that quartz glass is preferred for use in this apparatus. Pyrex glass may be used, but, in order to avoid the introduction of any errors into the results of combustion, it is necessary to season the Pyrex glass by subjecting it for a long period of time to the high frequency current which is to be used for the combustion. Arranged on opposite sides of the bulb 1 are plates 6 which are curved to conform with the periphery of the glass bulb. Each plate 6 is connected to a terminal 7 of a source of short wave radio frequency current.

The bulb 1 shown in Fig. 1 is part of a gas analyzing apparatus, namely, the trap in which condensables are collected. Such an apparatus is described in copending application Serial No. 183,960, filed January 8, 1938, by Leo Horvitz and entitled Means and method for analysis, now Patent 2,287,101, issued June 23, 1942. In order to make this clear, it may be pointed out that the soil sample is placed in a retort which is connected to a gas collection apparatus, of which the bulb 1 forms a part. As is known, the gas analyzing apparatus also includes chambers containing chemicals for the removal of carbon dioxide and water arranged ahead of the trap 1.

The gas, after passing through the purifying chambers, passes into trap 1 which, when used in this portion of the procedure, is surrounded with a bath of liquid nitrogen or other refrigerant to regulate the temperature so as to condense out of the gas ethane and higher hydrocarbons. After the condensate is collected the residual gas is pumped out until the pressure in the chamber is reduced to about ten mm. and conducted to a combustion chamber for the burning of any methane and hydrogen contained in the original gas sample in accordance with the procedure outlined in aforesaid Patent 2,287,101, the nitrogen bath is removed whereby the condensed constituents are allowed to vaporize in the chamber 1, and their pressure is measured so as to determine their volume. Then, with the valve 5 closed, an excess of oxygen is introduced into the chamber 1 through valve 3 which is then closed. Since the amount of condensed hydrocarbons is extremely small an excess of oxygen can be introduced without raising the pressure in the chamber above 50 mm. of mercury. The plates 6 are then arranged around the chamber and the radio frequency current applied. The inside of the chamber will glow brilliantly, not only during the process of combustion but after the process is complete. Experience has shown that complete combustion can be secured in one minute, but the minimum time for complete combustion has not been ascertained because a one minute period is as short as is practical for operations.

After the combustion period is over, the plates 6 are removed and a nitrogen trap is again applied to the chamber 1 so as to condense out the products of combustion, namely, carbon dioxide and water. Again the valve 5 is opened to permit the evacuation or removal of residual gas and then valve 5 is again closed, the nitrogen trap is removed, and again the pressure of the vaporized constituents is measured.

From the foregoing description it will be apparent that the plates 6 are readily removable. To this end these plates are arranged on a handle in the fashion of a fork which may be easily manipulated. This handle is shown in Fig. 2 as being composed of a hand portion 8, which may be wood or vulcanized rubber, and arms 9 connected to the plates 6. These arms may be made of metal so long as they are well insulated from each other in the hand portion 8, or they can be made of an insulating material, such as Bakelite or porcelain. The ends of the arms are secured to the plates by bolting or by any other conventional means.

In the embodiment shown in Fig. 3, an induction coil 10 is used in place of the plates 6 in Fig. 1. Otherwise, this apparatus is the same as that shown in Fig. 1. It will be understood that the coil is embedded in a cylinder of insulating material provided with a handle so that the coil can be easily placed around the chamber 1.

In the preferred embodiment shown in Fig. 4, the condenser effect is used as in Fig. 1 except with a somewhat different arrangement. Here a framework is made up of four metal rings 11. The upper two rings are connected by a strip of metal 12, and the lower two rings are likewise connected by a strip of metal 13. The leads 7, from the source of radio-frequency current are connected to the metal strips 12 and 13. The framework is held rigid by rods 14 of which there may be any desired number. These rods are made of an insulating material, such as hard rubber, Bakelite, porcelain, or the like. The rods 14 may be used as handles for manipulating the device, or if desired, a separate handle may be applied to it.

It will be apparent that other embodiments of the present invention will be within the skill of those versed in the art. The embodiments shown are merely illustrative and are not intended to define the limits of the invention.

This application is related to my co-pending application, Serial No. 342,858, filed June 28, 1940, and entitled Gas analysis and combustion chamber therefor.

The nature and objects of the present invention having been thus described and illustrated, what is claimed as new and useful and is desired to be secured by Letters Patent is:

1. A method for analyzing a gas for a combustible constituent present in small concentration and having a boiling point higher than the remainder of the gas, which comprises passing the gas into a cool zone maintained at a temperature suitable for the condensation of said constituent, removing only residual gas from the condensed constituent, vaporizing the constituent, mixing it with an excess of oxygen insufficient to create a pressure in said closed chamber above that at which the mixture will glow under the influence of a high frequency electric current, subjecting the mixture to the action of short wave radio-frequency current and thereafter measuring the carbon dioxide and water formed.

2. A method for the complete combustion of a combustible gas which comprises mixing the gas with an excess of oxygen, confining the mixture in a closed chamber at a subatmospheric pressure at which the mixture will glow under the influence of a high frequency electric current, and subjecting the mixture in said chamber to the action of a short wave radio-frequency current.

3. A method according to claim 1 in which the pressure is maintained below fifty mm. of mercury.

4. A method according to claim 2 in which the pressure is maintained below fifty mm. of mercury.

CLARENCE C. BIES.